(12) United States Patent
Moon

(10) Patent No.: US 10,164,503 B2
(45) Date of Patent: Dec. 25, 2018

(54) POWER GENERATION SYSTEM USING VEHICLE

(71) Applicant: Hyeon Cheol Moon, Muan-gun (KR)

(72) Inventor: Hyeon Cheol Moon, Muan-gun (KR)

( * ) Notice: Subject to any disclaimer, the term of this patent is extended or adjusted under 35 U.S.C. 154(b) by 700 days.

(21) Appl. No.: 14/762,809

(22) PCT Filed: Jan. 23, 2014

(86) PCT No.: PCT/KR2014/000686
§ 371 (c)(1),
(2) Date: Jul. 23, 2015

(87) PCT Pub. No.: WO2014/116046
PCT Pub. Date: Jul. 31, 2014

(65) Prior Publication Data
US 2016/0056689 A1    Feb. 25, 2016

(30) Foreign Application Priority Data

Jan. 23, 2013  (KR) .................. 10-2013-0007691
Jun. 7, 2013   (KR) .................. 10-2013-0065095

(51) Int. Cl.
*H02K 7/18*      (2006.01)
*B60L 11/00*     (2006.01)
*H02K 53/00*     (2006.01)

(52) U.S. Cl.
CPC .......... *H02K 7/1869* (2013.01); *B60L 11/002* (2013.01); *H02K 53/00* (2013.01); *Y10S 74/09* (2013.01)

(58) Field of Classification Search
CPC ................ B60L 11/182; B60L 11/1846; B60L 11/1848; B60L 5/005; B60L 11/1837;
(Continued)

(56) References Cited

U.S. PATENT DOCUMENTS 3,914,562 A * 10/1975 Bolger .................... B60K 1/04
                                                        191/10
5,431,264 A    7/1995 Tseng
(Continued)

FOREIGN PATENT DOCUMENTS

JP      2010-246348      10/2010
KR   10-2009-0024238      3/2009
(Continued)

*Primary Examiner* — Joshua Benitez Rosario
*Assistant Examiner* — Leda Pham
(74) *Attorney, Agent, or Firm* — Lex IP Meister, PLLC

(57) ABSTRACT

The present invention relates to a power generation system using a vehicle. The power generation system includes: a vehicle, such as an automobile, a train, an airplane, and an escalator, for carrying people or freight; a movement route, such as a road, a railroad, and a runway, formed so that the vehicle can move thereon; and a power generation unit including a magnetic force generation portion and a magnetic force receiving portion alternatively installed in the vehicle and the movement route, and configured to generate electric energy using electromagnetic induction occurring due to relative movement between the magnetic force generation portion and the magnetic force receiving portion according to movement of the vehicle.

The power generation system using a vehicle according to the present invention has a power generation device installed in the vehicle to generate power during travel of the vehicle and also has a power generation device installed on a movement route of the vehicle to generate power, so that electric energy generated by the power generation device of the vehicle can be used or stored as power required for the vehicle and electric energy generated by the power generation device installed on the movement route can be supplied to safety facilities for safe travel of vehicles on the movement route or convenient facilities near the road, or stored in additional batteries.

11 Claims, 10 Drawing Sheets

(58) Field of Classification Search
CPC ....... B60L 11/1831; H02J 50/90; H02J 7/025; H02J 50/70; H02J 50/10; H02J 50/80; H02J 50/40; H01M 10/44
See application file for complete search history.

(56) References Cited

U.S. PATENT DOCUMENTS

| | | | |
|---|---|---|---|
| 9,004,594 B2* | 4/2015 | Hong | B60N 2/66 297/284.4 |
| 9,694,685 B2* | 7/2017 | Ricci | B60L 3/0015 |
| 2012/0186927 A1* | 7/2012 | Suh | B60L 11/1803 191/10 |
| 2015/0061897 A1* | 3/2015 | Kees | B60L 11/1846 340/932.2 |

FOREIGN PATENT DOCUMENTS

| | | |
|---|---|---|
| KR | 10-2011-0011740 | 2/2011 |
| KR | 10-1034492 | 5/2011 |

* cited by examiner

[Fig. 1]
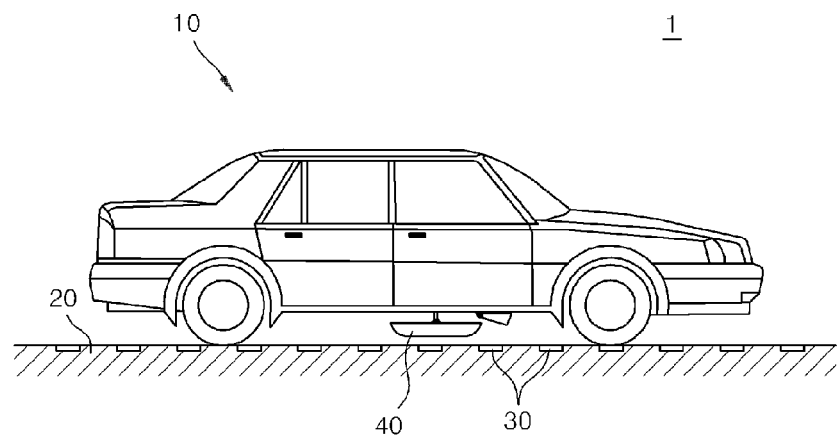
[Fig. 2]
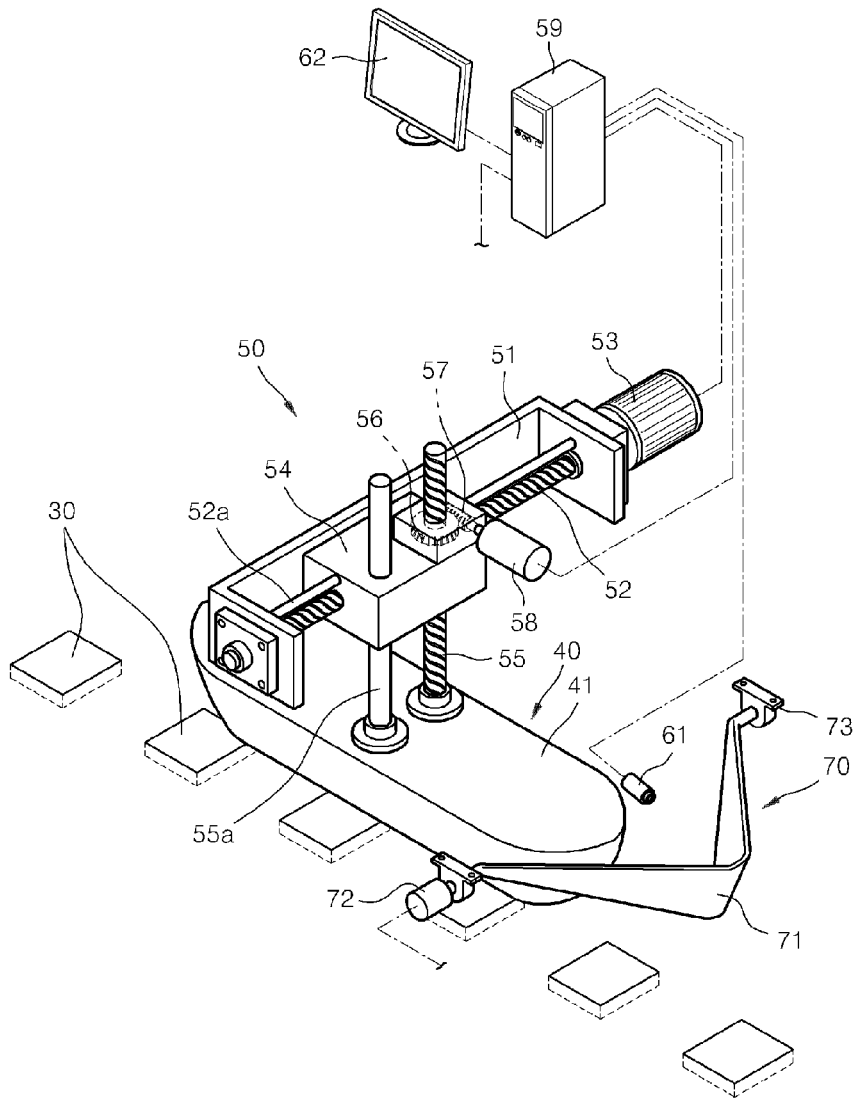

[Fig. 3]
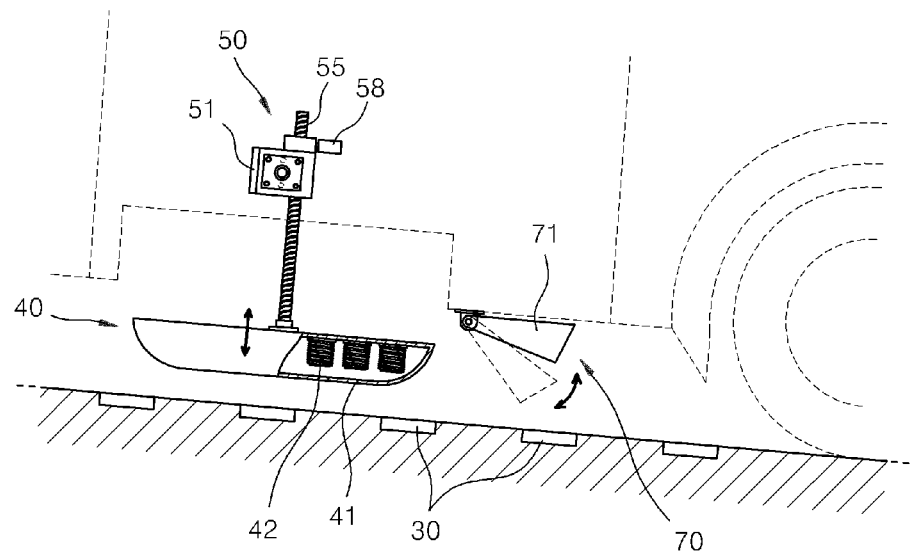
[Fig. 4]
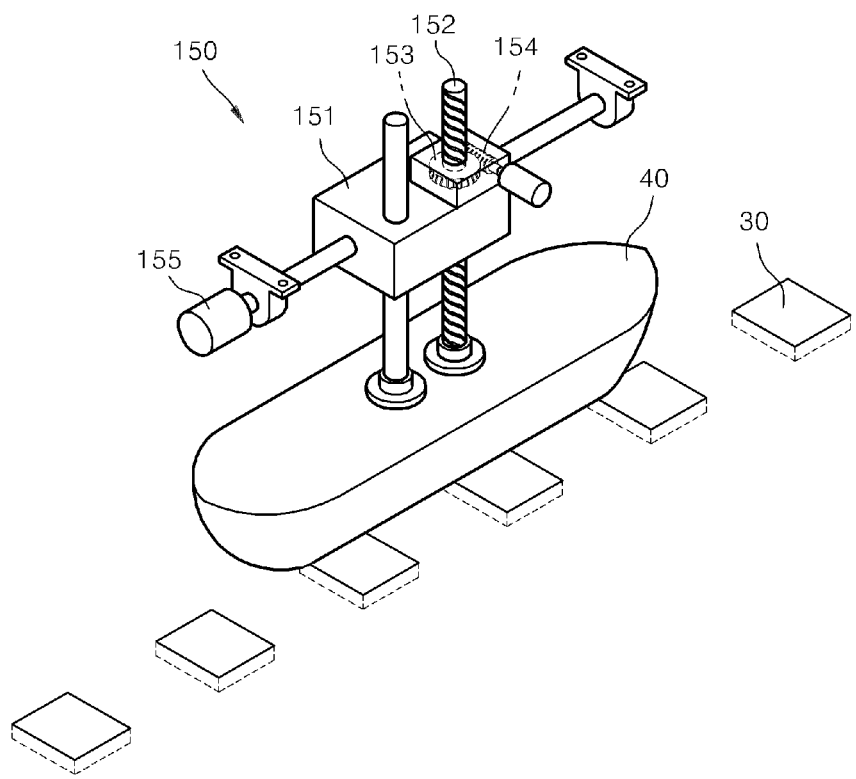

[Fig. 5]
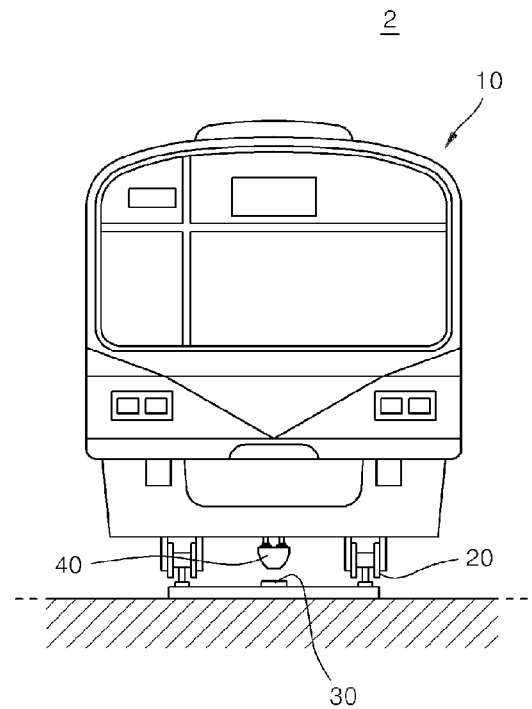
[Fig. 6]
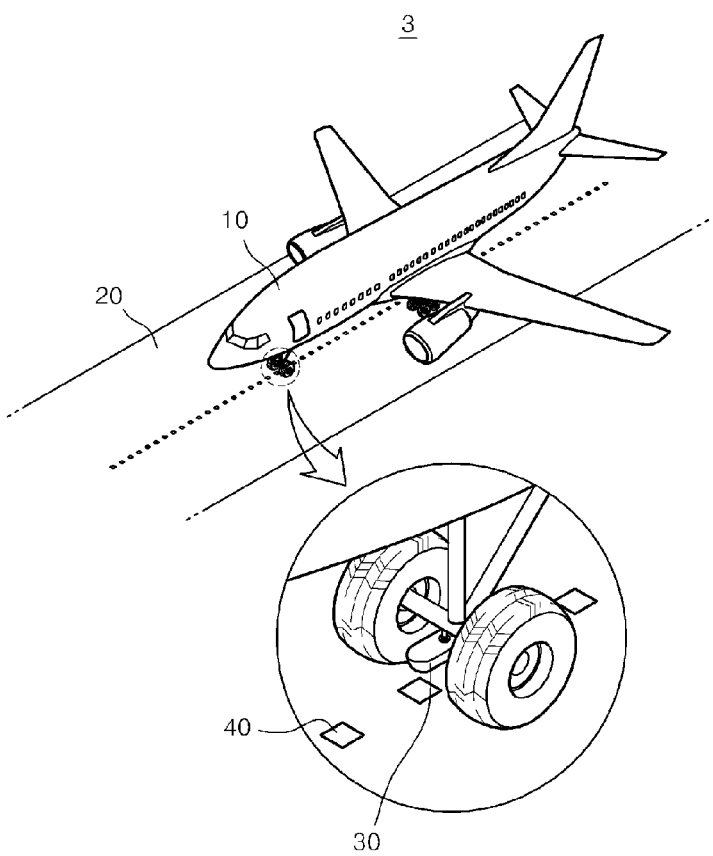

[Fig. 7]
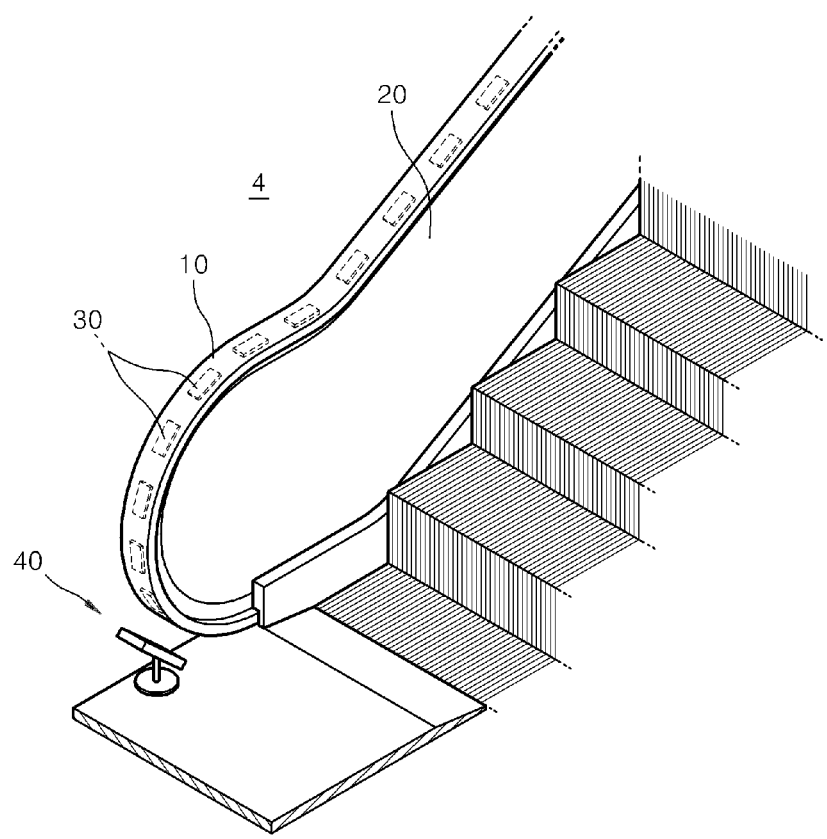

[Fig. 8]
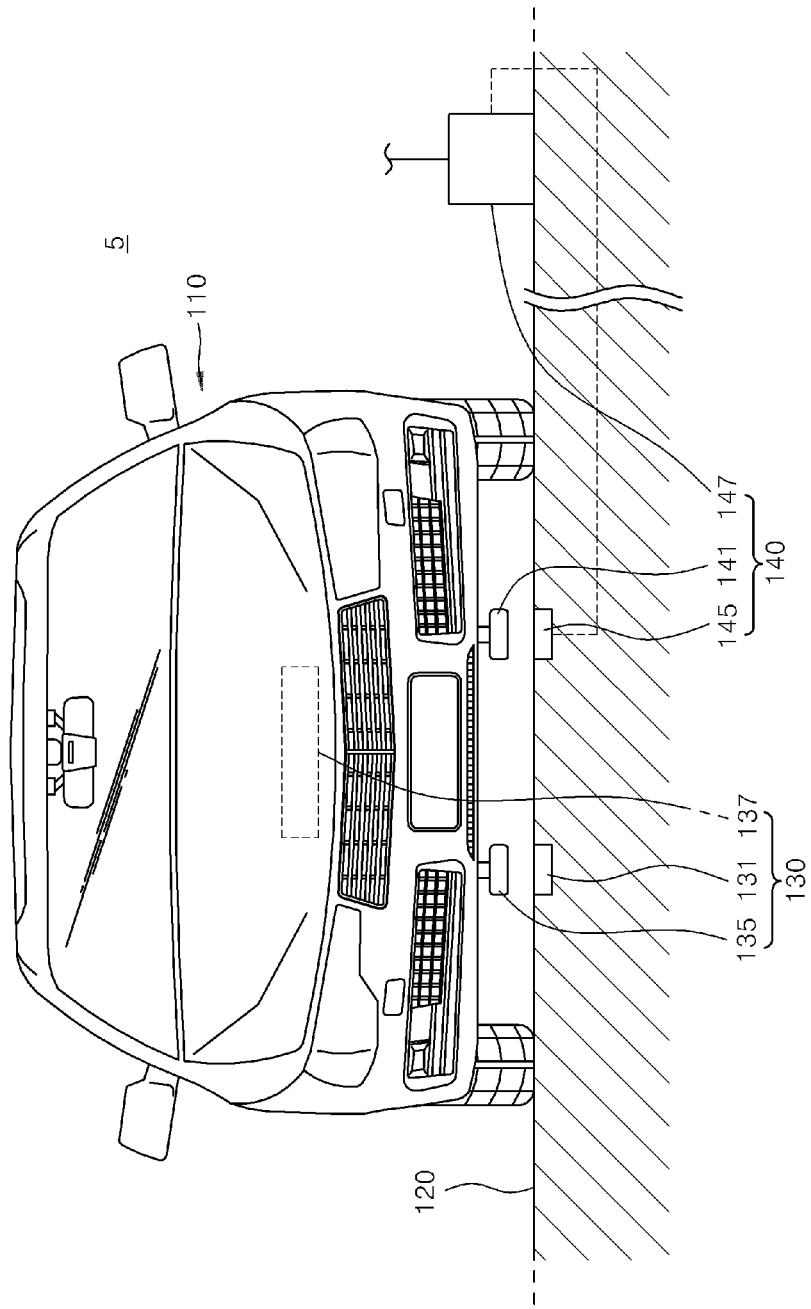

[Fig. 9]
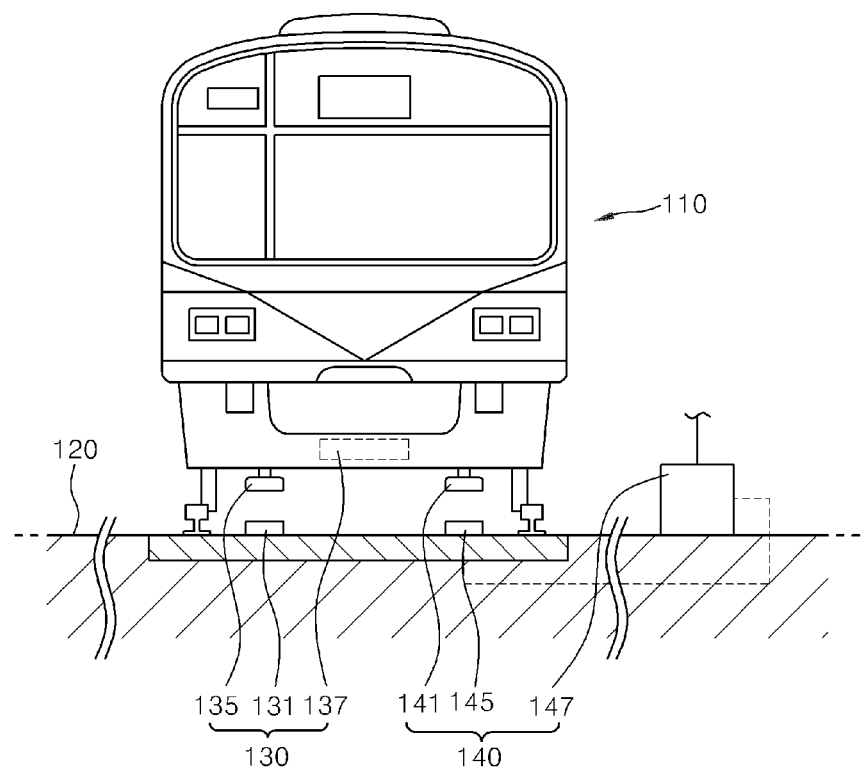

[Fig. 10]
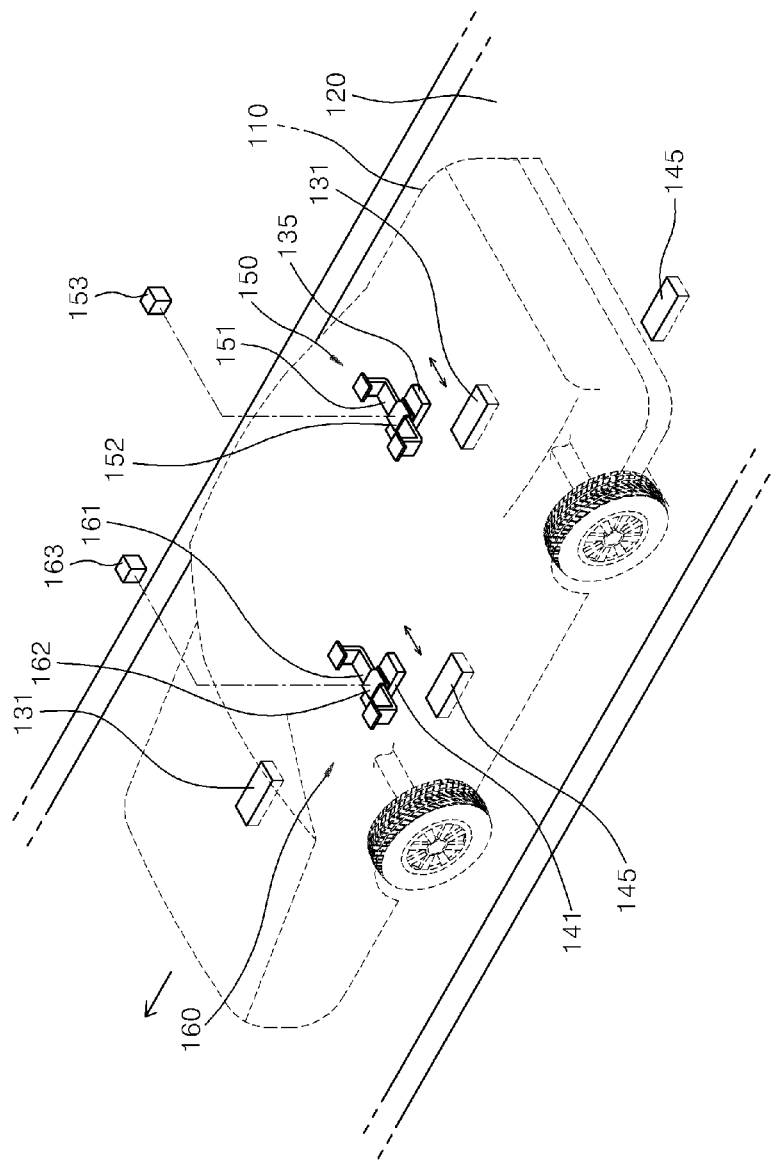

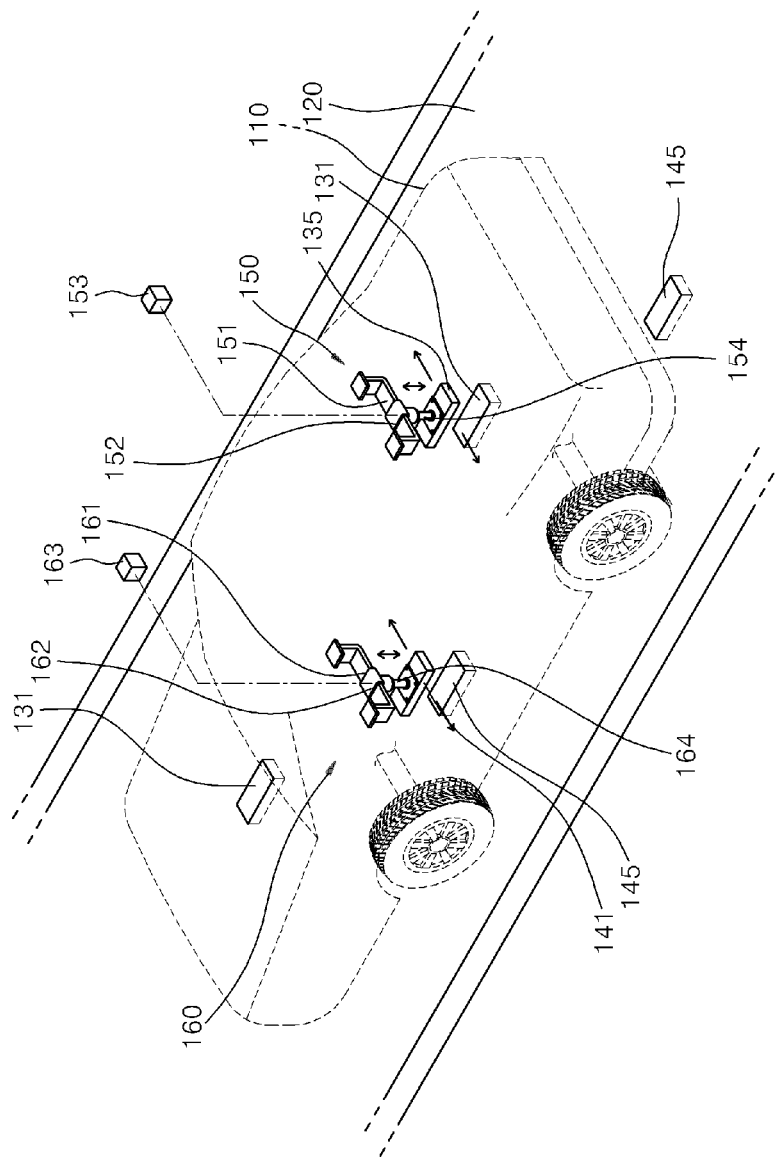
[Fig. 11]

[Fig. 12]
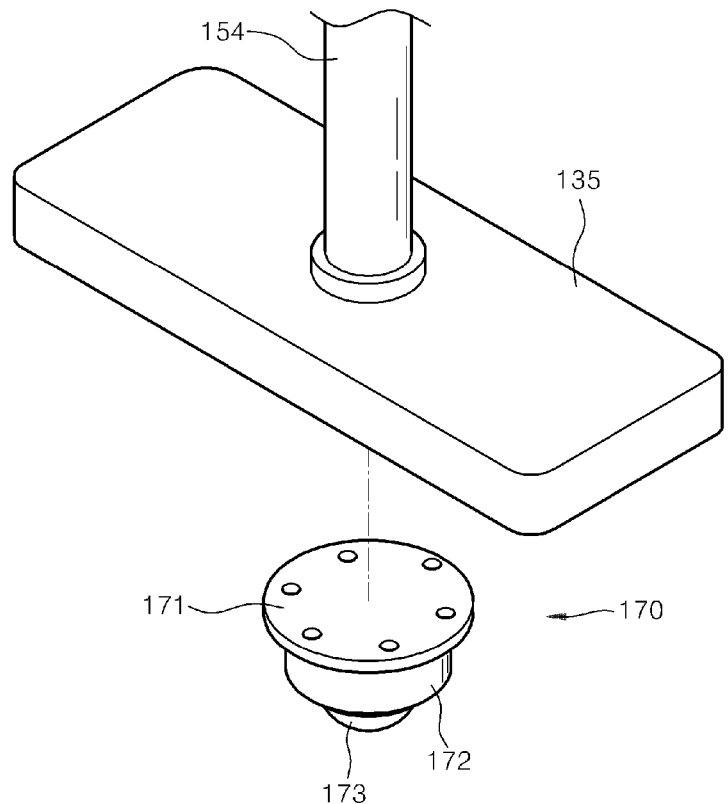
[Fig. 13]
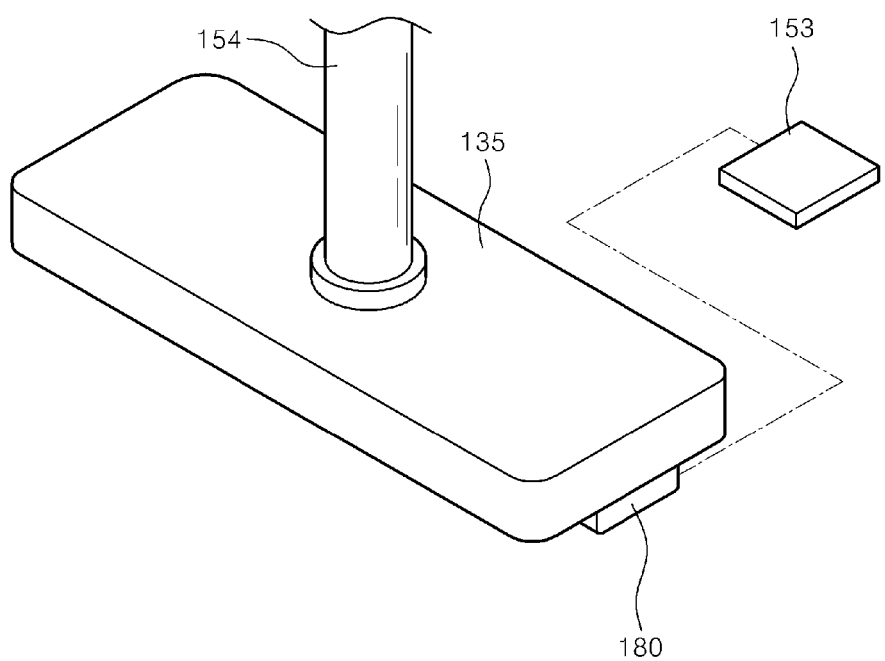

[Fig. 14]
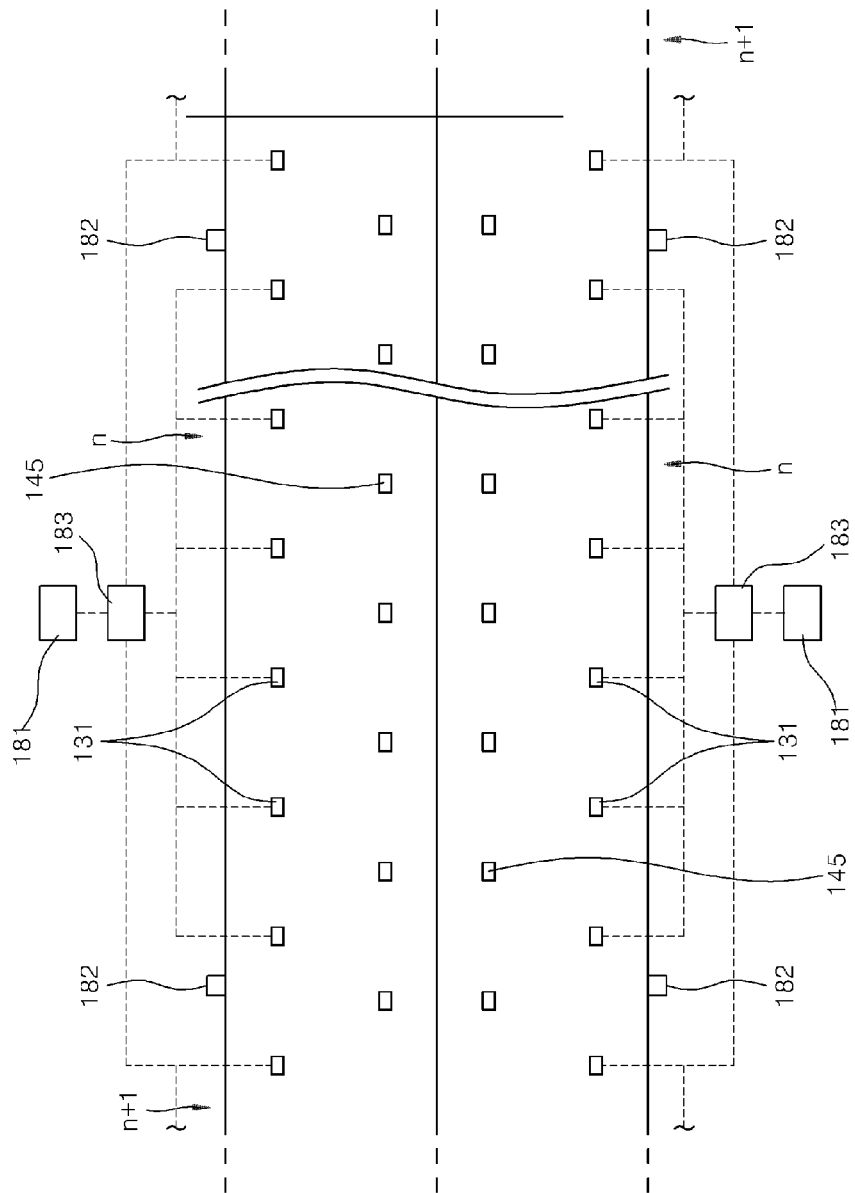

POWER GENERATION SYSTEM USING VEHICLE

TECHNICAL FIELD

The present invention relates to a power generation system, and more particularly, to a power generation system capable of producing electrical energy using a vehicle such as an automobile, a train, an airplane, and an escalator during travel of the automobile or the airplane for takeoff or landing on a runway.

BACKGROUND ART

Recently, due to worldwide energy exhaustion, new alternative energy and a variety of methods and apparatuses for efficient energy conservation during energy circulation are actively being developed. For example, a power generation device using sunlight has been developed in priority for typical alternative energy. In the power generation device using sunlight, a solar cell for directly receiving sunlight is configured, and a storage battery is charged with electric energy from the solar cell through a constant voltage circuit which uniformly maintains a voltage generated from the solar cell, so that the electric energy can be used as an auxiliary power source when necessary.

However, power production using the solar cell has low efficiency and disadvantages in that there is a significant difference in the amount of generated power according to the amount of light and it is not possible to produce power at night. Therefore, power production using the solar cell cannot serve as a main energy source of a country and can only be an auxiliary or experimental energy source.

In addition, energy generation systems using tidal power, wind power, and water power can be used as auxiliary power sources only in regions with appropriate natural conditions. Also, resultant generated voltages do not reach expected values or are significantly limited by surroundings, and an enormous cost of initial investment in equipment is necessary. Therefore, these energy generation systems are not common.

Accordingly, recycling of energy is attracting attention as alternative energy, and due to an explosive increase in the number of vehicles used all over the world, an energy recycling system using a vehicle is required. As an example of an energy recycling system using a vehicle, such as an automobile or a train, a road power generation system for generating electric energy using vibration caused by travel of vehicles is disclosed in Korean Patent Publication No. 10-2009-01018448.

The road power generation system generates power by converting vibration energy into electric energy using resonance gradually occurring with a larger vibration width when a vehicle-passing frequency caused by repeated weights on a road resulting from travel of vehicles and the unique frequency of the road power generation system installed in the road corresponding to the vehicle-passing frequency are equalized. The road power generation system includes: a plurality of vibration plates including a central vibration portion and a protruding vibration portion at one end, and laid under the surface of a road at regular intervals in a road width direction to vibrate according to a vehicle-passing frequency caused by repeated weights on the road resulting from travel of vehicles; support fixtures installed at two or more positions in the vibration plates to support the vibration plates; a unique frequency conversion device changing the unique frequency of the vibration plates; binding support portions coupling ends of the support fixtures and the vibration plates to rotate between the vibration plates and the support fixtures; and electricity generation portions coupled to one ends of the vibration plates. The road power generation system is characterized by equalizing the vehicle-passing frequency and the unique frequency of the vibration plates corresponding to the vehicle-passing frequency and generating power with an electricity generation portion coupled to a resonating vibration plate.

However, the road power generation system has a structure which generates power using vibration caused by travel of vehicles, and impact power caused by travel of vehicles is directly transferred to vibration plates. Therefore, the road power generation system has problems of deformation and damage caused by impact power.

As another example, Korean Patent Publication No. 10-2009-0121850 discloses an electric automobile having a hydraulic power generation system. The electric automobile having a hydraulic power generation system includes: a driving motor coupled to a driving wheel to transfer turning force; a decelerator installed between the driving motor and the driving wheel to change the turning force; a storage battery supplying power to operate the driving motor; a second driving motor connected to the storage battery to operate; a hydraulic pump receiving turning force from the second driving motor to compress oil and having an inflow port and an outflow port formed therein; an oil tank supplying the oil to the inflow port of the hydraulic pump; a hydraulic motor rotating due to a hydraulic pressure applied from the hydraulic pump; a power transfer portion including a drive gear and one or more driven gears installed at the hydraulic motor and an axis to transfer turning force; and one or more power generators connected to the power transfer portion to rotate and charge the storage battery with generated power.

However, the hydraulic power generation system has a structure in which the hydraulic pump is operated using electricity stored in the storage battery, the hydraulic motor is driven by the hydraulic pump, and power is generated by the power generators coupled to the hydraulic motor to charge the storage battery, that is, a structure in which power is generated using electricity stored in the storage battery and stored in the storage battery again. Therefore, power generation efficiency is low, and fuel-efficiency of a vehicle is degraded because heavy equipment, such as the second driving motor, the hydraulic motor, and the oil tank, should be mounted in the vehicle.

DISCLOSURE

Technical Problem

The present invention is proposed to solve the problems of related art and directed to providing a power generation system using a vehicle that produces electrical energy using the vehicle, such as an automobile, a train, an airplane, and an escalator, during travel of the automobile or the airplane for takeoff or landing on a runway, and can increase safety and efficiency of power generation by preventing impact power and vibration caused by travel of vehicles from being directly transferred thereto and by minimizing friction between pieces of equipment resulting from continuous maintenance of uniform distance between a magnet and a coil, which generate electric energy using electromagnetic induction, and continuous power generation.

The present invention is also directed to providing a power generation system using a vehicle that has a power generation device installed in the vehicle to generate power during travel of the vehicle and also has a power generation device installed on a movement route of the vehicle to generate power, so that electric energy generated by the power generation device of the vehicle can be used or stored as power required for the vehicle and electric energy generated by the power generation device installed on the movement route can be supplied to and stored in a road traffic facility for safe travel of vehicles or a convenient facility or transmitted to other facilities.

The present invention is also directed to providing a power generation system using a vehicle that enables a power generation unit installed in the vehicle to be inserted in or taken out of the vehicle as necessary so that damage to a power generation device installed in the vehicle can be prevented during travel of the vehicle.

Technical Solution

One aspect of the present invention provides a power generation system using a vehicle including: a vehicle configured to carry people or freight; a movement route formed so that the vehicle can move thereon; and a power generation unit including a magnetic force generation portion and a magnetic force receiving portion alternatively installed in the vehicle and the movement route, and configured to generate electric energy using electromagnetic induction occurring due to relative movement between the magnetic force generation portion and the magnetic force receiving portion.

The power generation system may further include a position adjustment unit configured to adjust a position of the magnetic force receiving portion between the magnetic force receiving portion installed in the vehicle and the magnetic force generation portion installed in the movement route so that the magnetic force receiving portion is disposed at a position corresponding to a position of the magnetic force generation portion.

The position adjustment unit may include: a fixing bracket installed in a lower portion of the vehicle; a first screw installed in the fixing bracket to be rotatable about a direction at right angles to a travel direction of the vehicle; a first driving motor installed at an end of the fixing bracket to rotate the first screw forward or backward; a slider threadedly engaged with the first screw and installed to be movable along the first screw; a second screw threadedly engaged with the slider in a direction at right angles to the first screw and having a lower end at which the magnetic force receiving portion is fixed; a worm wheel installed in the slider and meshed with the second screw to rotate the second screw; a worm meshed with the worm wheel; a second driving motor rotating the worm forward or backward; and a control portion configured to separately control operation of the first driving motor and the second driving motor.

The power generation system may further include a camera provided on one side of the magnetic force receiving portion to photograph an image of the movement route; and a display portion configured to display the image photographed by the camera.

The power generation system may further include an anti-collision portion installed in front of the magnetic force receiving portion under the vehicle and configured to prevent an object on the movement route from colliding with the magnetic force receiving portion.

The position adjustment unit may include: a body installed under the vehicle to be rotatable about a direction parallel with a travel direction of the vehicle; a screw threadedly engaged with the body, disposed in an up-down direction, and having a lower end at which the magnetic force receiving portion is fixed; a worm wheel installed inside the body and meshed with the screw; a worm meshed with the worm wheel; and a driving motor configured to rotate the worm forward or backward.

A plurality of electromagnets may be disposed at intervals along the movement route to form the magnetic force generation portion in the movement route, the magnetic force receiving portion including a plurality of armature coils may be installed under the vehicle, and the power generation system may further include a sensing portion including: a power supply portion configured to supply power to the electromagnets; proximity sensors installed at predetermined intervals on the movement route to sense approach of the vehicle to set positions; and a relay configured to selectively supply power to electromagnets installed between a corresponding proximity sensor sensing approach of the vehicle to a set position and a proximity sensor disposed at a position a predetermined distance away from the corresponding proximity sensor in a moving direction of the vehicle.

The power generation unit may include: a first power generation unit including first magnetic force provision portions installed along the movement route on the movement route and a first magnetic force receiving portion installed in the vehicle between the vehicle and the movement route, and configured to generate power using electromagnetic induction occurring due to relative movement of the first magnetic force receiving portion with respect to the first magnetic force provision portions; and a second power generation unit including a second magnetic force provision portion installed at a position away from the first magnetic force receiving portion in the vehicle and second magnetic force receiving portions installed away from the first magnetic force provision portions along the movement route on the movement route, and configured to generate power using electromagnetic induction occurring due to relative movement of the second magnetic force provision portion with respect to the second magnetic force receiving portions.

The power generation system may further include a position adjustment unit configured to separately control respective positions of the first magnetic force receiving portion and the second magnetic force provision portion in the vehicle so that the first magnetic force receiving portion and the second magnetic force provision portion can be moved to positions corresponding to positions of the first magnetic force provision portions and the second magnetic force receiving portions, respectively.

The position adjustment unit may include: a first position adjustment unit configured to move the first magnetic force receiving portion; and a second position adjustment unit configured to move the second magnetic force provision portion, the first position adjustment unit may include: a first guide installed in a direction at right angles to a travel direction of the vehicle on one side of a space portion provided under the vehicle; a first slider installed to be movable along the first guide and to which the first magnetic force receiving portion is coupled; a first thrust provision portion configured to provide thrust to the first slider; and a first control portion configured to control the first thrust provision portion, and the second position adjustment unit may include: a second guide installed a predetermined distance away from the first guide in a direction parallel with a longitudinal direction of the first guide on another side of the space portion; a second slider installed to be movable along the second guide and to which the second magnetic force provision portion is coupled; a second thrust provision portion configured to provide thrust to the second slider; and a second control portion configured to control the second thrust provision portion.

The first position adjustment unit may further include a first elevation portion installed between the first slider and the first magnetic force receiving portion and configured to move the first magnetic force receiving portion up or down, and the second position adjustment unit may further include a second elevation portion installed between the second slider and the second magnetic force provision portion and configured to move the second magnetic force provision portion up or down.

Each of the first magnetic force receiving portion and the second magnetic force provision portion may have a distance measuring sensor capable of measuring a distance from the movement route, and the first control portion and the second control portion may separately control the first elevation portion and the second elevation portion respectively according to distance information provided by the distance measuring sensors to move the first magnetic force receiving portion and the second magnetic force provision portion up or down.

The power generation system may further include anti-friction portions separately installed at the first magnetic force receiving portion and the second magnetic force provision portion to prevent the first magnetic force receiving portion and the second magnetic force provision portion from coming into contact or colliding with the movement route.

The power generation system may further include anti-friction portions separately installed at the first magnetic force receiving portion and the second magnetic force provision portion to prevent the first magnetic force receiving portion and the second magnetic force provision portion from coming into contact with the movement route.

The first magnetic force receiving portion and the second magnetic force provision portion may be installed at positions a predetermined distance away in a direction parallel with a travel direction of the vehicle and a predetermined distance away in a direction at right angles to the travel direction of the vehicle.

The second magnetic force provision portion may include a plurality of electromagnets disposed at intervals along the movement route on the movement route, and the power generation system may further include a sensing portion including: a power supply portion configured to supply power to the electromagnets; proximity sensors installed at predetermined intervals on the movement route to sense approach of the vehicle to set positions; and a relay configured to selectively supply power to electromagnets installed between a corresponding proximity sensor sensing approach of the vehicle to a set position and a proximity sensor disposed at a position a predetermined distance away from the corresponding proximity sensor in a moving direction of the vehicle.

Advantageous Effects

A power generation system using a vehicle according to the present invention produces electrical energy using the vehicle such as an automobile, a train, an airplane, and an escalator during travel of the automobile or the airplane for takeoff or landing on a runway, and can increase safety and efficiency of power generation by preventing impact power and vibration caused by travel of vehicles from being directly transferred thereto and by uniformly maintaining the distance between a magnet and a coil which generate electric energy using electromagnetic induction.

The power generation system using a vehicle according to the present invention has a power generation device installed in the vehicle to generate power during travel of the vehicle and also has a power generation device installed on a movement route of the vehicle to generate power, so that electric energy generated by the power generation device of the vehicle can be used or stored as power required for the vehicle and electric energy generated by the power generation device installed on the movement route can be supplied to and stored in a road traffic facility for safe travel of vehicles or a convenient facility or transmitted to other facilities.

The power generation system using a vehicle according to the present invention enables a power generation unit installed in the vehicle to be inserted in or taken out of the vehicle as necessary so that damage to a power generation device installed in the vehicle can be prevented during travel of the vehicle.

DESCRIPTION OF DRAWINGS

FIG. 1 is a schematic diagram of a power generation system using a vehicle according to a first exemplary embodiment of the present invention.

FIG. 2 is an enlarged perspective view of the power generation system using a vehicle shown in FIG. 1.

FIG. 3 is a side view showing a magnetic force generation portion and a magnetic force receiving portion shown in FIG. 2.

FIG. 4 is a perspective view showing another exemplary embodiment of a position adjustment unit shown in FIG. 2.

FIG. 5 is a front view of a power generation system using a vehicle according to a second exemplary embodiment of the present invention.

FIG. 6 is a perspective view of a power generation system using a vehicle (airplane) according to a third exemplary embodiment of the present invention.

FIG. 7 is a perspective view of a power generation system using a vehicle (escalator) according to a fourth exemplary embodiment of the present invention.

FIG. 8 is a front view of a power generation system using a vehicle according to a fifth exemplary embodiment of the present invention.

FIG. 9 is a front view showing another exemplary embodiment of the vehicle (train) shown in FIG. 8.

FIG. 10 is a perspective view of a power generation system using the vehicle (automobile) shown in FIG. 8.

FIG. 11 is a perspective view of a power generation system using a vehicle according to a seventh exemplary embodiment of the present invention.

FIG. 12 is a perspective view of a power generation system using a vehicle according to an eighth exemplary embodiment of the present invention.

FIG. 13 is a perspective view of a power generation system using a vehicle according to a ninth exemplary embodiment of the present invention.

FIG. 14 is a schematic diagram of a power generation system using a vehicle according to a tenth exemplary embodiment of the present invention.

MODES OF THE INVENTION

Hereinafter, a power generation system using a vehicle according to exemplary embodiments of the present invention will be described in detail with reference to the accompanying drawings. FIGS. 1 to 4 show a power generation system using a vehicle according to a first exemplary embodiment of the present invention.

Referring to FIGS. 1 to 4, a power generation system 1 using a vehicle according to the present invention includes a vehicle 10 for carrying people or freight, such as an automobile, a train, an airplane, and an escalator (referred to as "vehicle" below), a movement route 20 formed so that the vehicle 10 can move thereon, a magnetic force generation portion 30 and a magnetic force receiving portion 40 alternatively installed in the vehicle 10 and the movement route 20, and a power generation unit which generates electric energy using electromagnetic induction occurring due to relative movement between the magnetic force generation portion 30 and the magnetic force receiving portion 40 according to movement of the vehicle 10.

In this exemplary embodiment, a means of transportation, such as a car, a truck, a bus, a train, an airplane, or an escalator, is employed as the vehicle 10, and a road, a railroad, or a runway on which vehicles can travel and move is employed as the movement route 20.

The magnetic force generation portion 30 and the magnetic force receiving portion 40 are alternatively installed in the vehicle 10 and the movement route 20. When the magnetic force generation portion 30 is installed in the vehicle 10, the magnetic force receiving portion 40 is installed in the movement route 20, and when the magnetic force receiving portion 40 is installed in the vehicle 10, the magnetic force generation portion 30 is installed in the movement route 20. In this exemplary embodiment, a structure in which the magnetic force receiving portion 40 is installed in the vehicle 10 and magnetic force generation portions 30 are installed in the movement route 20 is employed.

Permanent magnets or electromagnets capable of generating magnetic flux to surroundings are employed as the magnetic force generation portions 30, which are disposed and installed at predetermined intervals along a road.

The permanent magnets or electromagnets employed as the magnetic force generation portions 30 may be laid under a road, or installed so that the surfaces of the magnets are exposed at the same level as the upper surface of the road. This is intended to cause a driver to easily recognize the positions of the magnets while minimizing interference with travel of the vehicle 10 caused by the magnets.

The magnetic force receiving portion 40 has a plurality of coils 42 and a body 41 accommodating the coils 42, and the body 41 is formed in a streamline shape to minimize air resistance when moved along with the vehicle 10. Although not shown in the drawings, magnetic cores may be disposed at the centers of the coils 42 to induce and increase magnetic flux.

The power generation system 1 using a vehicle according to the present invention further has a position adjustment unit 50 for adjusting the position of the magnetic force receiving portion 40 so that the magnetic force receiving portion 40 can be disposed at a position corresponding to the positions of the magnetic force generation portions 30 between the magnetic force receiving portion 40 installed in the vehicle 10 and the magnetic force receiving portions 30 installed in the movement route 20.

Referring to FIG. 2, the position adjustment unit 50 has a fixing bracket 51 installed in the vehicle 10, that is, in a lower portion of the vehicle 10, a first screw 52 installed in the fixing bracket 51 to be rotatable about a direction at right angles to the travel direction of the vehicle 10, a first driving motor 53 installed at an end of the fixing bracket 51 to rotate the first screw 52, a slider 54 threadedly engaged with the first screw 52 and installed to be reciprocally movable along the first screw 52 when the first screw rotates forward and backward, a second screw 55 threadedly engaged with the slider 54 in a direction at right angles to the first screw 52 and having a lower end at which the magnetic force receiving portion 40 is fixed, a worm wheel 56 installed in the slider 54 and meshed with the second screw 55 to rotate the second screw 55, a worm 57 meshed with the worm wheel 56, a second driving motor 58 rotating the worm 57 forward or backward, and a control portion 59 for separately controlling operation of the first driving motor 53 and the second driving motor 58.

The fixing bracket 51 has a base that is fixed in the lower portion of the vehicle 10 and extends in a direction at right angles to the longitudinal direction of the vehicle 10, and support portions that protrude from both ends of the base and support the first screw 52 to be rotatable.

In the fixing bracket 51, to prevent the slider 54 which will be described below from rotating in the same direction as the first screw 52 when the first screw 52 rotates, an anti-rotation rod 52a, both ends of which are supported by the support portions, is disposed to penetrate the slider 54 along a direction parallel with the first screw 52.

The slider 54 is threadedly engaged with the first screw 52 and installed to be reciprocally movable in the longitudinal direction of the first screw 52 according to a rotation direction of the first screw 52, and is prevented from rotating in conjunction with the first screw 52 by the anti-rotation rod 52a described above.

Also, a guide 55a installed to penetrate the slider 54 in a direction parallel with the second screw 55 is provided in the slider 54. When the magnetic force receiving portion 40 is moved upward or downward, the guide 55a prevents vibration and tilting of the magnetic force receiving portion 40.

The first driving motor 53 rotates the first screw 52 forward or backward to be moved in the left or right direction with respect to the travel direction of the vehicle 10, thereby positioning the magnetic force receiving portion 40 installed in the slider 54 at a position corresponding to the magnetic force generation portions 30 installed in the road. The second driving motor 58 rotates the second screw 55 forward or backward to move the magnetic force receiving portion 40 fixed at the lower end of the second screw 55 upward or downward.

In this way, the magnetic force receiving portion 40 can be moved to a position at which it is possible to receive the maximum magnetic force generated from the magnetic force generation portion 30 (a position at which the density of magnetic flux passing through a coil can be maximized), and thus efficient power generation is possible.

The power generation system 1 using a vehicle according to the present invention further has a camera 61 provided on one side of the magnetic force receiving portion 40 installed in the vehicle 10 to photograph an image of the movement route 20, and a display portion 62 displaying the image photographed by the camera 61.

The camera 61 is fixed at the side, that is, the body 41, of the magnetic force receiving portion 40 to photograph an image of the movement route 20 while the vehicle 10 travels or moves, and the display portion 62 is provided in the vehicle 10 to show the photographed image in real time to a driver who drives the vehicle 100 and cause the driver to recognize the state of the movement route 20 and the position of the magnetic force generation portion 30.

The power generation system 1 using a vehicle according to the present invention further has an anti-collision portion 70 fixed in front of the magnetic force generation portion 30 under the vehicle 10 to prevent a collision between an object on the movement route 20 and the magnetic force generation portion 30.

Referring to FIG. 3, the anti-collision portion 70 is installed under the vehicle 10 to be positioned in front of the position adjustment unit 50 and the magnetic force receiving portion 40, and an end thereof can rotate upward or downward.

The anti-collision portion 70 has a cover plate 71 for protecting the magnetic force receiving portion 40, support brackets 73 fixedly installed in the vehicle 10 to rotatably support both ends of the cover plate 71, and a driving motor 72 rotating either end of the cover plate 71.

Preferably, the anti-collision portion 70 is formed in a shape capable of reducing air resistance of the magnetic force receiving portion 40 during travel of the vehicle 10, and formed in a shape surrounding the magnetic force receiving portion 40 to prevent the magnetic force receiving portion 40 from being splattered with raindrops in case of rain or from colliding with a foreign material in flank.

Also, the anti-collision portion 70 may be additionally equipped with a brush (not shown) to prevent small foreign materials or obstacles from passing through the gap between the anti-collision portion 70 and the movement route 20 when the anti-collision portion 70 rotates downward due to the driving motor 72.

Further, although not shown in the drawings, the power generation system 1 using a vehicle according to the present invention may have an obstacle detection portion capable of detecting the presence of a foreign material ahead in the travel or moving direction of the vehicle 10 separately from the camera 61. The obstacle detection portion operates in conjunction with the anti-collision portion 70 described above, so that the vehicle 10 usually travels with the anti-collision portion 70 moved upward but the anti-collision portion 70 can be rotated downward by the driving motor 72 to prevent destruction and damage of the magnetic force receiving portion 40 when a foreign material ahead is detected by the obstacle detection portion.

Meanwhile, FIG. 4 shows another exemplary embodiment of a position adjustment unit. Referring to FIG. 4, a position adjustment unit 150 has a body 151 installed under the vehicle 10 to be rotatable about a direction parallel with the travel direction of the vehicle 10, a screw 152 disposed in the up-down direction and threadedly engaged with the body 151 and having a lower end at which the magnetic force receiving portion 40 is fixed, a worm wheel 153 installed inside the body 151 and meshed with the screw 152, a worm 154 meshed with the worm wheel 153, and a driving motor 155 installed on one side of the body 151 to rotate the worm 154 forward or backward.

When the screw 152 is rotated by the driving motor 155, the body 151 installed between brackets, which are installed in the lower portion of the vehicle 10, to be rotatable about a rotation axis is rotated in the left or right direction with respect to the travel direction of the vehicle 10 and thus can change, that is, tilt, the position of the magnetic force receiving portion 40.

A power generation system using a vehicle according to the present invention may include a train and rails as shown in FIG. 5. Referring to FIG. 5, a power generation system 2 using a vehicle according to the present invention has a vehicle 10, a movement route 20, a magnetic force receiving portion 40, and magnetic force generation portions 30. The vehicle 10 used in this exemplary embodiment is a train that transports people or freight, and the movement route 20 is rails that provide the moving path of the train. The magnetic force receiving portion 40 is installed under the vehicle 10, that is, the train, and the magnetic force generation portions 30 are installed on the rails.

Although not shown in FIG. 5, the power generation system 2 using a vehicle according to this exemplary embodiment also further has a position adjustment unit 50 that is a component of the power generation system 1 using a vehicle according to the first exemplary embodiment of the present invention described above with reference to FIGS. 1 to 4.

Meanwhile, a power generation system using a vehicle according to the present invention may be applied to an airplane and a runway for takeoff and landing of the airplane as shown in FIG. 6.

As shown in FIG. 6, in a power generation system 3 using a vehicle according to the present invention, an airplane that transports people or freight is employed as a vehicle 10, and a runway on which the airplane takes off or lands is employed as a movement route 20. A magnetic force generation portion 30 is fixed under a support axis that supports wheels of the airplane, and magnetic force receiving portions 40 are installed on the runway with the upper surfaces exposed. Unlike this exemplary embodiment, magnetic force generation portions 30 may be installed on the runway, and a magnetic force receiving portion 40 may be installed under the support axis.

Meanwhile, as shown in FIG. 7, a power generation system 4 using a vehicle according to the present invention may also be applied to an escalator having a conveyer belt which rotates like a caterpillar, and a support which supports the conveyer belt.

Referring to FIG. 7, in the power generation system 4 using a vehicle according to the present invention, a conveyer belt 10 of an escalator which moves people or freight from a lower floor to a higher floor is employed as a vehicle, and a support 20 which supports the conveyer belt 10 to be rotatable is employed as a movement route. Magnetic force generation portions 30 which are bendable magnets are installed in the conveyer belt 10, and a magnetic force receiving portion 40 is installed to be exposed on the support 20 and directed to the conveyer belt 10.

Unlike FIG. 7, a magnetic force receiving portion 40 may be installed in the support 20, and magnetic force generation portions 30 may be installed on stair members forming stairs while moving along the support 20 in the escalator.

Meanwhile, although not shown in the drawings, a magnetic force generation portion of a power generation system using a vehicle according to the present invention can be configured with an electromagnet as another exemplary embodiment of the present invention.

A power generation system using a vehicle according to the present invention has a vehicle, a movement route, magnetic force generation portions, a magnetic force receiving portion, and a sensing portion which partially supplies and distributes power to the magnetic force receiving portion.

In the power generation system using a vehicle according to this exemplary embodiment, a plurality of electromagnets are disposed at predetermined intervals along a movement route to form the magnetic force generation portions, and the magnetic force receiving portion having a plurality of embedded armature coils is installed under the vehicle.

The magnetic force generation portions form a plurality of sections with a plurality of electromagnets sequentially disposed within a set range classified as one group. The respective sections are separately supplied with power through relays which will be described below.

The sensing portion includes a power supply portion which supplies power to the electromagnets, proximity sensors which are installed at predetermined intervals on the movement route to sense approach of the vehicle to set positions, and a relay which selectively supplies power to electromagnets installed between the corresponding proximity sensor sensing approach of the vehicle to a set position and a proximity sensor disposed at a position a predetermined distance away from the corresponding proximity sensor in the moving direction of the vehicle.

Here, the proximity sensors are installed at section-specific start positions of the magnetic force generation portions, that is, at intervals corresponding to the lengths of the respective sections.

A common power source may be used as the power supply portion, but preferably, it is possible to use electric energy generated by a sunlight power generation device having solar cells installed on the movement route (a road or rails) to generate electricity from sunlight or a wind-driven power generation device having blades and capable of generating electric energy using wind pressure caused by travel of the vehicle.

Also, to increase the magnetic force of the electromagnets employed as the magnetic force generation portions, power supplied from the power supply portion is passed through an amplifier, so that power generation efficiency can be increased by instantly increasing the magnetic force.

When the vehicle enters a one-side section (referred to as "first section" below) of the magnetic force generation portions as described above, electromagnets forming the first section are supplied with power through a relay. When a proximity sensor installed at the start position of a section (referred to as "second section" below) next to the first section senses approach of the vehicle as the vehicle travels, the relay cuts off the power supplied to the first section and supplies power to electromagnets forming the second section.

As described above, the proximity sensors and the magnetic force generation portions are classified according to the plurality of sections, and magnetic power for electromagnets to generate power is provided only to electromagnets in a section through which the vehicle passes by the relays which separately supply power to the respective sections, so that power can be efficiently managed. Also, when no vehicle passes, it is possible to prevent the magnetic force generation portions from continuously collecting magnetic substances, such as metals, on a road by cutting off power.

As the sensors, proximity sensors can be employed, but piezoelectric elements which generate electricity using a weight and an impact power caused by travel of the vehicle may be used. In this case, there is an advantage in that the power supply portion can be omitted.

Meanwhile, FIGS. 8 to 10 show power generation systems using a vehicle according to a fifth exemplary embodiment of the present invention.

Referring to FIGS. 8 to 10, a power generation system 5 using a vehicle according to this exemplary embodiment has a vehicle 110, a movement route 120 formed so that the vehicle 110 can move, and a power generation unit.

As shown in FIG. 8, an automobile, such as a car, a truck, or a bus, is employed as the vehicle 110 described in this exemplary embodiment, and a road on which the automobile can travel or move is employed as the movement route 120. However, as shown in FIG. 9, a train may be employed as the device 110, and rails may be employed as the movement route 120. Although not shown in the drawings, an airplane, an escalator, an elevator, etc. may be employed as the vehicle 110, and a runway of an airport, an elevator hoistway formed in a building, a guide rail installed in the elevator hoistway, etc. may be employed as the movement route 120.

In other words, it is possible to use the vehicle 110 in any form capable of transporting people or freight and the movement route 120 in any form in which the vehicle 110 can travel.

The power generation unit includes: a first power generation unit 130 including first magnetic force provision portions 131 installed along the movement route 120 on the movement route 120 and a first magnetic force receiving portion 135 installed in the vehicle 110 between the vehicle 110 and the movement route 120, and generating power using electromagnetic induction occurring due to relative movement of the first magnetic force receiving portion 135 with respect to the first magnetic force provision portions 131; and a second power generation unit 140 including a second magnetic force provision portion 141 installed at a position away from the first magnetic force receiving portion 135 in the vehicle 110 and second magnetic force receiving portions 145 installed away from the first magnetic force provision portions 131 along the movement route 120 on the movement route 120, and generating power using electromagnetic induction occurring due to relative movement of the second magnetic force provision portion 141 with respect to the second magnetic force receiving portions 145.

The first power generation unit 130 includes the first magnetic force provision portions 131 installed on the movement route 120, that is, a road, to form a magnetic field in the surrounding space, the first magnetic force receiving portion 135 installed in the vehicle 110 moving along the movement route 120, that is, in a lower portion of the vehicle 110, a rectifier, which is not shown in the drawings, converting alternating current (AC) generated by the first magnetic force receiving portion 135 into direct current (DC), a first storage battery 137, a camera (not shown) installed in the vehicle 110 to photograph the road surface, and a display (not shown) displaying an image acquired through the camera to a driver in the vehicle 110.

The display may selectively or simultaneously display the amount of electric energy generated by the first magnetic force receiving portion 135 as well as the image acquired through the camera.

The first magnetic force provision portions 131 are disposed at predetermined intervals along the road, and configured with a plurality of permanent magnets or electromagnets. The first magnetic force provision portions 131 may be completely laid under the road, or may be installed so that the surfaces of the permanent magnets or the electromagnets are exposed at the same level as the upper surface of the road. This is intended to cause the driver to easily recognize the positions of the magnets while minimizing interference in travel of the vehicle 110 caused by the permanent magnets.

Preferably, the first magnetic force provision portions 131 have protective cases to protect the first magnetic force provision portions 131 from collision or foreign materials during travel. Preferably, the protective cases are formed of a material that does not influence magnetic force generated by the first magnetic force provision portions 131

The first magnetic force receiving portion 135 has a plurality of coil portions and a housing for accommodating the coil portions. The coil portions include coils and magnetic cores which are installed inside the coils to draw magnetic force lines provided by the first magnetic force provision portions 131 so that the magnetic force lines pass through the coils and to increase the density of magnetic force lines passing through the coils.

Preferably, the housing has a predetermined solidity to protect the coil portions from external collision and foreign materials and is formed of a material through which magnetic fields can pass.

When the vehicle (automobile) 110 moves along the movement route (road) 120, the density of magnetic flux provided by the first magnetic force provision portions 131 is continuously changed in the first magnetic force receiving portion 135. Therefore, AC is generated in the first magnetic force receiving portion 135 due to electromagnetic induction, converted into DC through the rectifier, and stored in the first storage battery 137. When the vehicle 110 is an electric vehicle (EV) using electric energy, electric energy generated by the first magnetic force receiving portion 135 can also be used as the power source of the vehicle 110.

The second power generation unit 140 includes a second magnetic force provision portion 141 installed under the vehicle 110 to form a magnetic field region in a space between the vehicle 110 and the road, second magnetic force receiving portions 145 installed on the road along the road, a rectifier converting AC generated by the second magnetic force receiving portions 145 into DC, and a second storage battery 147 storing power generated by the second magnetic force receiving portions 145.

The second magnetic force provision portion 141 is installed under the vehicle 110 away from the first magnetic force receiving portion 135 by a predetermined distance in the width direction of the vehicle 110, and is configured with a permanent magnet. The second magnetic force receiving portions 145 may be configured with electromagnets.

The second magnetic force receiving portions 145 are installed on the road at predetermined intervals along the road, and installed at a predetermined distance from the first magnetic force provision portions 131 in the width direction of the road.

The first magnetic force receiving portion 135 and the second magnetic force provision portion 141 are disposed under the vehicle 110 a predetermined distance away from each other in a direction parallel with the travel direction of the vehicle 110 and a predetermined distance away from each other in a direction at right angles to the travel direction of the vehicle 110. In other words, the first magnetic force receiving portion 135 and the second magnetic force provision portion 141 are alternately disposed in the travel direction of the vehicle 110.

The second magnetic force receiving portions 145 and the first magnetic force provision portions 131 installed in the road may also be alternately disposed a predetermined distance away from each other in an extending direction of the road and a predetermined distance away from each other in the width direction of the road to correspond to the arrangement of the first magnetic force receiving portion 135 and the second magnetic force provision portion 141, or may be disposed in parallel with the width direction of the road.

When the vehicle 110 moves along the movement route 120, the second magnetic force provision portion 141 also moves along with the vehicle 110, and the density of magnetic flux is continuously changed in the second magnetic force receiving portions 145 installed in the movement route 120. Therefore, AC is generated due to electromagnetic induction, converted into DC through the rectifier, and stored in the second storage battery 147.

Electric energy generated in the second magnetic force receiving portions 145 and stored in the second storage battery 147 can be used as a power source of road traffic facilities, such as street lights and traffic lights, installed in the road and a power source that can be transmitted to facilities near the road.

Although not shown in the drawings, when the vehicle 110 is relatively long, the first magnetic force receiving portion 135 of the first power generation unit 130 and the second magnetic force provision portion 141 of the second power generation unit 140 may be additionally installed so that two or more first magnetic force receiving portions 135 and two or more second magnetic force provision portions 141 are a predetermined distance away from each other in the longitudinal direction of the vehicle 110.

The power generation system using a vehicle according to the present invention further has a position adjustment unit for separately adjusting the respective positions of the first magnetic force receiving portion 135 and the second magnetic force provision portion 141 in the vehicle 110 so that the first magnetic force receiving portion 135 and the second magnetic force provision portion 141 can be moved to positions corresponding to the positions of the first magnetic force provision portions 131 and the second magnetic force receiving portions 145, respectively.

The position adjustment unit includes a first position adjustment unit 150 that moves the first magnetic force receiving portion 135 in both directions at right angles to the travel direction of the vehicle 110, and a second position adjustment unit 160 that moves the second magnetic force provision portion 141 in both directions at right angles to the travel direction of the vehicle 110.

The first position adjustment unit 150 has a first guide 151 installed in a direction at right angles to the travel direction or the longitudinal direction of the vehicle 110 on one side of a space portion provided to form a certain volume under the vehicle 110, a first slider 152 installed to be movable along the first guide 151 and under which the first magnetic force receiving portion 135 is coupled, a first thrust provision portion providing thrust to the first slider 152 so that the first slider 152 can move along the first guide 151, and a first control portion 153 controlling the first thrust provision portion.

As the first position adjustment unit 150, a linear motor that reciprocally moves a transfer target in a general inspection equipment stage, liquid crystal display (LCD) equipment, semiconductor testing equipment, semiconductor processing equipment, factory automation equipment, etc. is employed.

In this exemplary embodiment, a linear guide generally installed in a base constituting a linear motor and a slider moving along the guide are employed as the first guide 151 and the first slider 152, respectively. A magnet installed in the base of the leaner motor and a coil installed at the slider are also employed as the first thrust provision portion, and a linear encoder or sensor detecting the position of the slider, a controller for controlling the position of the slider in real time, a driver, etc. are employed as the first control portion 153. The linear motor is a general component, and thus the detailed description thereof will be omitted.

The second position adjustment unit 160 has a second guide 161 installed a predetermined distance away from the first guide 151 in a direction parallel with the longitudinal direction of the first guide 151 on the other side of the space portion, a second slider 162 installed to be movable along the second guide 161 and under which the second magnetic force provision portion 141 is coupled, a second thrust provision portion providing thrust to the second slider 162 so that the second slider 162 can move along the second guide 161, and a second control portion 163 controlling the second thrust provision portion.

The second position adjustment unit 160 is configured with the same technical elements as the first position adjustment unit 150 described above except for a target whose position will be adjusted, and thus the detailed description thereof will be omitted.

As described above, using the first position adjustment unit 150 and the second position adjustment unit 160, it is possible to separately move the first magnetic force receiving portion 135 and the second magnetic force provision portion 141 to positions corresponding to the first magnetic force provision portions 131 and the second magnetic force receiving portions 145 in the vehicle 110. In other words, when the first magnetic force receiving portion 135 or the second magnetic force provision portion 141 are positioned to deviate from the positions of the first magnetic force provision portions 131 or the second magnetic force receiving portions 145, the driver of the vehicle 110 can move the first magnetic force receiving portion 135 or the second magnetic force provision portion 141 to a position corresponding to the first magnetic force provision portions 131 or the second magnetic force receiving portions 145 through the controller by adjusting a steering device of the vehicle 110 through a display in the vehicle 110 without changing the travel direction of the vehicle 110.

Meanwhile, the positions of the first magnetic force receiving portion 135 and the second magnetic force provision portion 141 can be directly adjusted by the driver through the controller, but may also be automatically adjusted. In this case, it is possible to acquire an image of the road surface in real time, compare the acquired image with a reference image, that is, an image acquired through the camera when the first magnetic force receiving portion 135 is positioned to correspond to the positions of the first magnetic force provision portions 131, and control the first slider 152 and the second slider 162 to move in the left and right directions through the first control portion 153 and the second control portion 163 until the image acquired in real time approximately coincides with the reference image.

Meanwhile, the power generation system using a vehicle according to the present invention further has a first elevation portion 154 that move the first magnetic force receiving portion 135 up or down and a second elevation portion 164 that moves the second magnetic force provision portion 141 up or down.

Referring to FIG. 11, the first elevation portion 154 is installed between the first slider 152 and the first magnetic force receiving portion 135 to move the first magnetic force receiving portion 135 up or down with respect to the first slider 152. The highest position to which the first magnetic force receiving portion 135 can be lifted by the first elevation portion 154 is set to a height at which the first magnetic force receiving portion 135 is not exposed from the lower portion of the vehicle 110, and the lowest position to which the first magnetic force receiving portion 135 can be lowered by the first elevation portion 154 is set to a height a predetermined distance away from the upper surface of the road.

The second elevation portion 164 is installed between the second slider 162 and the second magnetic force provision portion 141 to move the second magnetic force provision portion 141 up or down with respect to the second slider 162.

Like the first elevation portion 154, the highest position to which the second magnetic force provision portion 141 can be lifted by the second elevation portion 164 is set to a height at which the second magnetic force provision portion 141 is not exposed from the lower portion of the vehicle 110, and the lowest position to which the second magnetic force provision portion 141 can be lowered by the second elevation portion 164 is set to a height a predetermined distance away from the upper surface of the road.

The first elevation portion 154 and the second elevation portion 164 are separately operated by the first control portion 153 and the second control portion 163 each provided in the first position adjustment unit 150 and the second position adjustment unit 160, more specifically, the respective controllers.

Although not shown in the drawings, the power generation system using a vehicle according to this exemplary embodiment may have opening and closing portions for opening or closing passages in which the first magnetic force receiving portion 135 and the second magnetic force provision portion 141 are moved up or down so that the first magnetic force receiving portion 135 and the second magnetic force provision portion 141 inserted in the vehicle 110 by the first elevation portion 154 and the second elevation portion 164 can be isolated from external space. The opening and closing portions may be configured to slide shutters in a direction parallel with the vehicle 110, or may be configured to open or close the shutters using actuators.

A power generation system using a vehicle and having the first elevation portion 154 and the second elevation portion 164 described above according to the present invention has advantages in that, when it rains, a road environment is poor, or the vehicle 110 stops travel, it is possible to prevent damage and contamination of the first magnetic force receiving portion 135 and the second magnetic force provision portion 141 by inserting the first magnetic force receiving portion 135 and the second magnetic force provision portion 141 in the vehicle 110, and it is possible to generate power by causing the first magnetic force receiving portion 135 and the second magnetic force provision portion 141 to protrude from the vehicle 110 as necessary.

Meanwhile, as shown in FIG. 12, the power generation system using a vehicle according to the present invention can further have anti-friction portions 170 separately installed at the first magnetic force receiving portion 135 and the second magnetic force provision portion 141 to prevent the first magnetic force receiving portion 135 and the second magnetic force provision portion 141 from coming into contact with the road.

Referring to FIG. 12, the anti-friction portions 170 include a flange 171 coupled under the first magnetic force receiving portion 135, a support portion 172 supporting a spherical ball 173 to be rotatable while accommodating the ball 173 therein under the flange 171, and the ball installed in the support portion 172 to be rotatable.

The anti-friction portions 170 make rolling contact with protrusions on the road so that the protrusions on the road do not fractionize the first magnetic force receiving portion 135 and the second magnetic force provision portion 141 shown in FIGS. 9 to 11 while the first magnetic force receiving portion 135 and the second magnetic force provision portion 141 are lowered by the first elevation portion 154 and the second elevation portion 164 respectively. As the anti-friction portions 170, general ballcasters can be employed.

As shown in FIG. 13, the power generation system using a vehicle according to the present invention further has distance measuring sensors 180 installed at each of the first magnetic force receiving portion 135 and the second magnetic force provision portion 141 to measure the distance between the first magnetic force receiving portion 135 and the road and the distance between the second magnetic force provision portion 141 and the road.

Referring to FIG. 13, the distance measuring sensors 180 are coupled under each of the first magnetic force receiving portion 135 and the second magnetic force provision portion 141, and connected to the first control portion 153 and the second control portion 163. The distance measuring sensors 180 measure each of the distance between the first magnetic force receiving portion 135 and the road and the distance between the second magnetic force provision portion 141 and the road and transmit the measured distance information to the first control portion 153 and the second control portion 163.

The first control portion 153 operates the first elevation portion 154 based on the distance information so that the distance between the first magnetic force receiving portion 135 and the road is maintained at a set distance, and the second control portion 163 also operates the second elevation portion 164 based on the distance information so that the distance between the second magnetic force provision portion 141 and the road is maintained at a set distance.

Also, the first control portion 153 and the second control portion 163 receive the distance information measured by the distance measuring sensors 180, convert it into data and compare the data. When the deviation within the data is greater than a set deviation, the first control portion 153 and the second control portion 163 determine that the road surface is in a poor state, and may operate the first elevation portion 154 and the second elevation portion 164 to lift the first magnetic force receiving portion 135 and the second magnetic force provision portion 141.

In the power generation system using a vehicle according to the present invention, although not shown in the drawings, obstacle detection portions may be installed at each of the first magnetic force receiving portion 135 and the second magnetic force provision portion 141 to detect the presence of a foreign material ahead in the travel or moving direction of the vehicle 110 on the movement route 120 separately from the distance measuring sensors 180. The obstacle detection portions may include laser generators that emit laser light forward and light-receivers that receive light reflected and returning.

When the laser light emitted from the laser generators of the obstacle detection portions does not arrive at the light-receivers within a set time, the first control portion 153 and the second control portion 163 determine that there is no foreign material ahead. When reflected light arrives at the light-receivers within the set time, the first control portion 153 and the second control portion 163 determine that there is a foreign material ahead and can prevent destruction and damage of the first magnetic force receiving portion 135 and the second magnetic force provision portion 141 by lifting the first magnetic force receiving portion 135 and the second magnetic force provision portion 141 through the first elevation portion 154 and the second elevation portion 164.

In the power generation system using a vehicle according to the present invention, the first control portion 153 and the second control portion 163 can comprehensively compare and analyze distance information measured by the distance measuring sensors 180 and information about whether or not there is a foreign material acquired through the obstacle detection portions and control the first elevation portion 154 and the second elevation portion 164 in an integrated manner.

For example, the first control portion 153 can lift the first magnetic force receiving portion 135 through the first elevation portion 154 when it is determined that the road surface is in a favorable state and there is a foreign material ahead, but can lower the first magnetic force receiving portion 135 through the first elevation portion 154 when it is determined that the road surface is in the favorable state and there is no foreign material ahead. Also, the first control portion 153 can lift the first magnetic force receiving portion 135 through the first elevation portion 154 when it is determined that the road surface is in the poor state and there is a foreign material ahead, and can lower the first magnetic force receiving portion 135 through the first elevation portion 154 when it is determined that the road surface is in the poor state but there is no foreign material ahead.

Although not shown in the drawings, the power generation system using a vehicle according to the present invention may further have anti-collision portions for preventing the first magnetic force receiving portion 135 and the second magnetic force provision portion 141 from colliding with a foreign material on the road and being destroyed.

The anti-collision portions may include laser diodes that are installed on one sides of the first magnetic force receiving portion 135 and the second magnetic force provision portion 141 and emit light having a wavelength set in a direction parallel to the travel direction of the vehicle 110 to sense a foreign material ahead in the travel direction of the vehicle 110, and photodiodes that receive light emitted from the laser diodes and reflected by a foreign material a predetermined distance ahead of the vehicle 110.

The photodiodes are connected to each of the first control portion 153 and the second control portion 163. When the amounts of light received by the photodiodes are a predetermined value or more, the first control portion 153 and the second control portion 163 determine that there is a foreign material ahead in the travel direction of the vehicle 110, and control the first elevation portion 154 and the second elevation portion 164 to lift the first magnetic force receiving portion 135 and the second magnetic force provision portion 141 or control the display installed in the vehicle 110 to display the foreign material so that the driver manipulates the steering device to change a path. In this way, it is possible to prevent the first magnetic force receiving portion 135 and the second magnetic force provision portion 141 from colliding with a foreign material.

Meanwhile, FIG. 14 shows an exemplary embodiment in which first magnetic force provision portions 131 of a first power generation unit 130 are configured with electromagnets in the technical configuration of a power generation system using a vehicle according to the present invention and sensing portions are further provided to partially supply power to the first magnetic force provision portions 131. Referring to FIG. 14, the power generation system using a vehicle has a vehicle, a movement route 120, a first power generation unit, a second power generation unit, and the sensing portion.

As the vehicle, the movement route 120, and the second power generation unit, those of the power generation system using a vehicle according to the present invention described in detail with reference FIGS. 8 and 9 are employed.

The first power generation unit includes first magnetic force provision portions 131 installed in a road, and a first magnetic force receiving portion installed in the vehicle 110. Unlike the first exemplary embodiment of the present invention, the first magnetic force provision portions 131 are configured with electromagnets rather than permanent magnets.

The sensing portions include power supply portions 181 that supply power to the first magnetic force provision portions 131, that is, the electromagnets, proximity sensors 182 that are installed at predetermined intervals on the road to sense approach of the vehicle 110 to set positions, and relays 183 that selectively supply power to some electromagnets constituting first magnetic force provision portions 131 installed between the corresponding proximity sensor 182 sensing approach of the vehicle 110 to a set position and a proximity sensor 182 disposed at a position a predetermined distance away from the corresponding proximity sensor 182 in the moving direction of the vehicle 110.

The first magnetic force provision portions 131 form a plurality of sections with a plurality of electromagnets sequentially disposed within a set range classified as one group. The respective sections are separately supplied with power from the power supply portions 181 through the relays 183. All electromagnets constituting a selected section are connected in parallel to be simultaneously supplied with power.

When approach of the vehicle 110 is sensed by a sensing portion, supplied power is passed through an amplifier to increase magnetic force, and magnetic force provided by electromagnets is instantly increased, so that power generation efficiency can be increased.

The proximity sensors 182 are installed at section-specific start positions of the first magnetic force provision portions 131 or ahead of the section-specific start positions, and installed at intervals corresponding to the lengths of the respective sections.

A common power source may be used as the power supply portions 181, but preferably, it is possible to use electric energy generated by a sunlight power generation device having solar cells installed on the movement route 120 to generate electricity from sunlight or a wind-driven power generation device having blades and generating electric energy using wind pressure caused by travel of the vehicle 110.

When the vehicle 110 enters the start position of a one-side section (referred to as "n-th section" below) of the first magnetic force provision portions 131 as described above, electromagnets forming the n-th section are supplied with power through a relay 183. When a proximity sensor 182 installed at the start position of a section (referred to as "(n+1)-th section" below) next to the n-th section senses approach of the vehicle 110 as the vehicle 110 travels along the road, the relay 183 cuts off the power supplied to the n-th section and supplies power to electromagnets forming the (n+1)-th section.

As described above, the proximity sensors 182 and the first magnetic force provision portions 131 are classified according to the plurality of sections, and magnetic flux for electromagnets to generate power is provided only to electromagnets in a certain section through which the vehicle 110 passes by the relays 183 which separately supply power to the respective sections, so that power can be efficiently managed. Also, when the vehicle 110 does not pass, it is possible to prevent the first magnetic force provision portions 131 from continuously collecting magnetic substances, such as metals, on the road by cutting off power.

The proximity sensors 182 for sensing approach of the vehicle 110 to a one-side section may be implemented with piezoelectric sensors which generate electricity using a weight and an impact power caused by travel of the vehicle 110 or light-emitting diodes and photodiodes.

The relays 183 may supply power to the first magnetic force provision portions 131 for only a set time when entry of the vehicle 110 is sensed by a proximity sensor 182. In this case, the set time is preferably set to a value obtained by dividing the distance of each section by the average speed of the vehicle 110 passing through the respective sections.

In the above-described power generation systems using a vehicle according to the present invention, the position adjustment unit shown in FIGS. 2 to 4 can be changed with the position adjustment units shown in FIGS. 9 to 11, and the position adjustment units shown in FIGS. 9 to 11 can be changed with the position adjustment unit shown in FIGS. 2 to 4.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A power generation system using a vehicle, the system comprising:
    a vehicle configured to carry people or freight;
    a movement route formed so that the vehicle can move thereon;
    a power generation unit including a magnetic force generation portion and a magnetic force receiving portion alternatively installed in the vehicle and the movement route, and configured to generate electric energy using electromagnetic induction occurring due to relative movement between the magnetic force generation portion and the magnetic force receiving portion; and
    a position adjustment unit configured to adjust a position of the magnetic force receiving portion between the magnetic force receiving portion installed in the vehicle and the magnetic force generation portion installed in the movement route so that the magnetic force receiving portion is disposed at a position corresponding to a position of the magnetic force generation portion;
    wherein the position adjustment unit comprises:
    a fixing bracket installed in a lower portion of the vehicle;
    a first screw installed in the fixing bracket to be rotatable about a direction at right angles to a travel direction of the vehicle;
    a first driving motor installed at an end of the fixing bracket to rotate the first screw forward or backward;
    a slider threadedly engaged with the first screw and installed to be movable along the first screw;
    a second screw threadedly engaged with the slider in a direction at right angles to the first screw and having a lower end at which the magnetic force receiving portion is fixed;
    a worm wheel installed in the slider and meshed with the second screw to rotate the second screw;
    a worm meshed with the worm wheel;
    a second driving motor rotating the worm forward or backward; and
    a control portion configured to separately control operation of the first driving motor and the second driving motor.

2. The power generation system of claim 1, further comprising:
    a camera provided on one side of the magnetic force receiving portion to photograph an image of the movement route; and
    a display portion configured to display the image photographed by the camera.

3. The power generation system of claim 1 further comprising an anti-collision portion installed in front of the magnetic force receiving portion under the vehicle and configured to prevent an object on the movement route from colliding with the magnetic force receiving portion.

4. The power generation system of claim 1, wherein the position adjustment unit comprises:
a body installed under the vehicle to be rotatable about a direction (an axis?) parallel with a travel direction of the vehicle;
a screw threadedly engaged with the body, disposed in an up-down direction, and having a lower end at which the magnetic force receiving portion is fixed;
a worm wheel installed inside the body and meshed with the screw;
a worm meshed with the worm wheel; and
a driving motor configured to rotate the worm forward or backward.

5. The power generation system of claim 1, wherein a plurality of electromagnets are disposed at intervals along the movement route to form the magnetic force generation portion in the movement route,
the magnetic force receiving portion including a plurality of armature coils is installed under the vehicle,
further comprising a sensing portion comprising:
a power supply portion configured to supply power to the electromagnets;
proximity sensors installed at predetermined intervals on the movement route to sense approach of the vehicle to set positions; and
a relay configured to selectively supply power to electromagnets installed between a corresponding proximity sensor sensing approach of the vehicle to a set position and a proximity sensor disposed at a position a predetermined distance away from the corresponding proximity sensor in a moving direction of the vehicle.

6. A power generation system using a vehicle, the system comprising:
a vehicle configured to carry people or freight;
a movement route formed so that the vehicle can move thereon; and
a power generation unit including a magnetic force generation portion and a magnetic force receiving portion alternatively installed in the vehicle and the movement route, and configured to generate electric energy using electromagnetic induction occurring due to relative movement between the magnetic force generation portion and the magnetic force receiving portion,
wherein the power generation unit comprises:
a first power generation unit including first magnetic force provision portions installed along the movement route on the movement route and a first magnetic force receiving portion installed in the vehicle between the vehicle and the movement route, and configured to generate power using electromagnetic induction occurring due to relative movement of the first magnetic force receiving portion with respect to the first magnetic force provision portions; and
a second power generation unit including a second magnetic force provision portion installed at a position away from the first magnetic force receiving portion in the vehicle and second magnetic force receiving portions installed away from the first magnetic force provision portions along the movement route on the movement route, and configured to generate power using electromagnetic induction occurring due to relative movement of the second magnetic force provision portion with respect to the second magnetic force receiving portions, and wherein the system further comprises a position adjustment unit configured to separately control respective positions of the first magnetic force receiving portion and the second magnetic force provision portion in the vehicle so that the first magnetic force receiving portion and the second magnetic force provision portion can be moved to positions corresponding to positions of the first magnetic force provision portions and the second magnetic force receiving portions, respectively
wherein the position adjustment unit comprises:
a first position adjustment unit configured to move the first magnetic force receiving portion; and
a second position adjustment unit configured to move the second magnetic force provision portion,
the first position adjustment unit comprises:
a first guide installed in a direction at right angles to a travel direction of the vehicle on one side of a space portion provided under the vehicle;
a first slider installed to be movable along the first guide and to which the first magnetic force receiving portion is coupled;
a first thrust provision portion configured to provide thrust to the first slider; and
a first control portion configured to control the first thrust provision portion, and
the second position adjustment unit comprises:
a second guide installed a predetermined distance away from the first guide in a direction parallel with a longitudinal direction of the first guide on another side of the space portion;
a second slider installed to be movable along the second guide and to which the second magnetic force provision portion is coupled;
a second thrust provision portion configured to provide thrust to the second slider; and
a second control portion configured to control the second thrust provision portion.

7. The power generation system of claim 6, wherein the first position adjustment unit further comprises a first elevation portion installed between the first slider and the first magnetic force receiving portion and configured to move the first magnetic force receiving portion up or down, and
the second position adjustment unit further comprises a second elevation portion installed between the second slider and the second magnetic force provision portion and configured to move the second magnetic force provision portion up or down.

8. The power generation system of claim 7, wherein each of the first magnetic force receiving portion and the second magnetic force provision portion has a distance measuring sensor capable of measuring a distance from the movement route, and
the first control portion and the second control portion separately control the first elevation portion and the second elevation portion respectively according to distance information provided by the distance measuring sensors to move the first magnetic force receiving portion and the second magnetic force provision portion up or down.

9. The power generation system of claim 6, further comprising anti-friction portions separately installed at the first magnetic force receiving portion and the second magnetic force provision portion to prevent the first magnetic force receiving portion and the second magnetic force provision portion from coming into contact with the movement route.

10. The power generation system of claim 6, wherein the first magnetic force receiving portion and the second magnetic force provision portion are installed at positions a predetermined distance away in a direction parallel with a travel direction of the vehicle and a predetermined distance away in a direction at right angles to the travel direction of the vehicle.

11. The power generation system of claim 6, wherein the second magnetic force provision portion includes a plurality of electromagnets disposed at intervals along the movement route on the movement route, and further comprising a sensing portion comprising:
a power supply portion configured to supply power to the electromagnets;
proximity sensors installed at predetermined intervals on the movement route to sense approach of the vehicle to set positions; and
a relay configured to selectively supply power to electromagnets installed between a corresponding proximity sensor sensing approach of the vehicle to a set position and a proximity sensor disposed at a position a predetermined distance away from the corresponding proximity sensor in a moving direction of the vehicle.

\* \* \* \* \*